US009946774B2

(12) United States Patent
Schuil et al.

(10) Patent No.: US 9,946,774 B2
(45) Date of Patent: *Apr. 17, 2018

(54) METHOD AND SYSTEM FOR LIMITING SHARE OF VOICE OF INDIVIDUAL USERS

(71) Applicant: eBay Inc., San Jose, CA (US)

(72) Inventors: Robin Johan Schuil, Emmeloord (NL); Rutger Mooy, Utrecht (NL); Selina H. van Panhuys, Amsterdam (NL)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/450,752

(22) Filed: Mar. 6, 2017

(65) Prior Publication Data
US 2017/0177680 A1 Jun. 22, 2017

Related U.S. Application Data

(63) Continuation of application No. 15/220,876, filed on Jul. 27, 2016, now Pat. No. 9,600,535, which is a continuation of application No. 14/828,254, filed on Aug. 17, 2015, now Pat. No. 9,430,537, which is a continuation of application No. 14/506,884, filed on Oct. 6, 2014, now Pat. No. 9,129,022, which is a continuation of application No. 13/921,184, filed on Jun. 18, 2013, now Pat. No. 8,856,106, which is a
(Continued)

(51) Int. Cl.
G06F 17/30 (2006.01)
G06Q 30/06 (2012.01)
G06Q 30/08 (2012.01)

(52) U.S. Cl.
CPC .... *G06F 17/30554* (2013.01); *G06F 17/3053* (2013.01); *G06Q 30/0625* (2013.01); *G06Q 30/08* (2013.01)

(58) Field of Classification Search
None
See application file for complete search history.

(56) References Cited

U.S. PATENT DOCUMENTS 8,473,497 B2 6/2013 Schuil et al.
8,856,106 B2 10/2014 Schuil et al.
(Continued)

FOREIGN PATENT DOCUMENTS

WO WO-2012044584 A1 4/2011

OTHER PUBLICATIONS eBay, "Identical Items and Finding Updates", Jul. 31, 2008, https://community.ebay.com/t5/Announcements/A-Message-from-Jeff-King-Identical-Items-and-Finding-Updates/ba-p/26162550.*
(Continued)

*Primary Examiner* — Son T Hoang
(74) *Attorney, Agent, or Firm* — Shook, Hardy & Bacon L.L.P.

(57) ABSTRACT

In various example embodiments, a system and method for limiting shares of voice of individual users in a result set are provided. In example embodiments, for each publication of a plurality of publications in a set, an entity associated with the publication is identified. Using a sorting criteria, a sorted set is generated by sorting the plurality of publications in accordance with the sorting criteria by shifting a particular publication from the same entity one or more positions in order to satisfy the sorting criteria. The sorted set is provided to a searching user.

20 Claims, 9 Drawing Sheets

Related U.S. Application Data continuation of application No. 13/157,626, filed on Jun. 10, 2011, now Pat. No. 8,473,497.

(60) Provisional application No. 61/386,861, filed on Sep. 27, 2010.

(56) References Cited

U.S. PATENT DOCUMENTS

| | | | |
|---|---|---|---|
| 9,129,022 | B2 | 9/2015 | Schuil et al. |
| 9,430,537 | B2 | 8/2016 | Schuil et al. |
| 9,600,535 | B2 | 3/2017 | Schuil et al. |
| 2002/0178163 | A1 | 11/2002 | Mayer |
| 2004/0220864 | A1 | 11/2004 | Popovitch |
| 2006/0167864 | A1 | 7/2006 | Bailey et al. |
| 2007/0143206 | A1* | 6/2007 | Cui .................. G06Q 30/0617 705/37 |
| 2007/0192318 | A1 | 8/2007 | Ramer et al. |
| 2008/0263016 | A1 | 10/2008 | Lokitz |
| 2009/0254410 | A1* | 10/2009 | Chang .................. G06Q 30/00 705/14.45 |
| 2010/0036806 | A1* | 2/2010 | Lam .................. G06F 17/3087 707/706 |
| 2010/0169239 | A1* | 7/2010 | Weng .................. G06Q 30/02 705/400 |
| 2010/0179879 | A1* | 7/2010 | Cunningham ...... G06F 17/2247 705/14.71 |
| 2011/0029392 | A1* | 2/2011 | Brown .............. G06F 17/30029 705/14.73 |
| 2012/0078887 | A1 | 3/2012 | Schuil et al. |
| 2013/0282708 | A1 | 10/2013 | Schuil et al. |
| 2015/0026168 | A1 | 1/2015 | Schuil et al. |
| 2015/0356156 | A1 | 12/2015 | Schuil et al. |
| 2016/0335268 | A1 | 11/2016 | Schuil et al. |

OTHER PUBLICATIONS

"U.S. Appl. No. 13/157,626, Final Office Action dated Nov. 30, 2012", 11 pgs.

"U.S. Appl. No. 13/157,626, Non Final Office Action dated May 24, 2012", 12 pgs.

"U.S. Appl. No. 13/157,626, Notice of Allowance dated Mar. 1, 2013", 15 pgs.

"U.S. Appl. No. 13/157,626, Response filed Jan. 30, 2013 to Final Office Action dated Nov. 30, 2012", 8 pgs.

"U.S. Appl. No. 13/157,626, Response filed Aug. 24, 2012 to Non Final Office Action dated May 24, 2012", 13 pgs,.

"U.S. Appl. No. 13/921,184, Non Final Office Action dated Feb. 13, 2014", 14 pgs.

"U.S. Appl. No. 13/921,184, Notice of Allowance dated Jun. 5, 2014", 18 pgs.

"U.S. Appl. No. 13/921,184, Response filed May 13, 2014 to Non Final Office Action dated Feb. 13, 2014", 14 pgs.

"U.S. Appl. No. 13/923,184, Preliminary Amendment filed Jul. 17, 2013", 8 pgs.

"U.S. Appl. No. 14/506,884, Notice of Allowance dated May 8, 2015", 16 pgs.

"U.S. Appl. No. 14/506,884, Pre-Interview First Office Action dated Feb. 24, 2015", 9 pgs.

"U.S. Appl. No. 14/506,884, Preliminary Amendment filed Oct. 30, 2014", 7 pgs.

"U.S. Appl. No. 14/506,884, Response filed Mar. 26, 2015 to Pre-Interview First Office Action dated Feb. 24, 2015", 6 pgs.

"U.S. Appl. No. 14/828,254, 312 Amendment filed Jul. 19, 2016", 3 pgs.

"U.S. Appl. No. 14/828,254, First Action Interview Pre-Interview Communication dated Mar. 4, 2016", 4 pgs.

"U.S. Appl. No. 14/828,254, Notice of Allowance dated Apr. 22, 2016", 19 pgs.

"U.S. Appl. No. 14/823,254, Preliminary Amendment filed Aug. 21, 2015", 7 pgs.

"U.S. Appl. No. 14/828,254, PTO Response to Rule 312 Communication dated Jul. 25, 2016", 2 pgs.

"U.S. Appl. No. 14/828,254, Response Filed Apr. 4, 2016 to Pre-Interview Communication", 6 pgs.

"U.S. Appl. No. 15/220,876 Preliminary Amendment Filed Jul. 28, 2016", 8 pgs.

"U.S. Appl. No. 15/220,876, Examiner Interview Summary dated Oct. 20, 2016", 3 pgs.

"U.S. Appl. No. 15/220,876, First Action Interview-Pre-Interview Communication dated Sep. 1, 2016", 4 pgs.

"U.S. Appl. No. 15/220,876, Notice of Allowance dated Nov. 15, 2016", 11 pgs.

"U.S. Appl. No. 15/220,876, Response to First Action Interview filed Sep. 26, 2016", 6 pgs.

"Identical Items and Finding Updates", [Online]. Retrieved from the Internet: <http://www2.ebay.com/aw/coreI200807311600062.html:clk_rvUd=344532643390>,(Jul. 31, 2008), 2 pgs.

"International Application Serial No. PCT/US2011/035129, International Preliminary Report on Patentability dated Apr. 2, 2013", 5 pgs.

"International Application Serial No. PCT/US2011/053283, Search Report dated Dec. 19, 2011", 2 pgs.

"International Application Serial No. PCT/US2011/053283, Written Opinion dated Dec. 19, 2011", 4 pgs.

King, Jeff, "eBay", [Online]. Retrieved from the Internet: <URL: <http://www2.ebay.com/aw/core/200807311600062.html>, (Jul. 31, 2008), 2 pgs.

U.S. Appl. No. 13/157,626 U.S. Pat. No. 8,473,497, filed Jun. 10, 2011, Method and System for Limiting Share of Voice of Individual Users.

U.S. Appl. No. 13/921,184 U.S. Pat. No. 8,856,106, filed Jun. 18, 2013, Method and System for Limiting Share of Voice of Individual Users.

U.S. Appl. No. 14/506,884 U.S. Pat. No. 9,129,022, filed Oct. 6, 2014, Method and System for Limiting Share of Voice of Individual Users.

U.S. Appl. No. 14/828,254 U.S. Pat. No. 9,430,537, filed Aug. 17, 2015, Method and System for Limiting Share of Voice of Individual Users.

U.S. Appl. No. 15/220,876 U.S. Pat. No. 9,600,535, filed Jul. 27, 2016, Method and System for Limiting Share of Voice of Individual Users.

* cited by examiner

METHOD AND SYSTEM FOR LIMITING SHARE OF VOICE OF INDIVIDUAL USERS

RELATED APPLICATIONS

This application is a continuation of U.S. application Ser. No. 15/220,876, filed Jul. 27, 2016, and entitled "METHOD AND SYSTEM FOR LIMITING SHARE OF VOICE OF INDIVIDUAL USERS," which is a continuation of U.S. application Ser. No. 14/828,254, filed Aug. 17, 2015, now U.S. Pat. No. 9,430,537, and entitled "METHOD AND SYSTEM FOR LIMITING SHARE OF VOICE OF INDIVIDUAL USERS," which is a continuation of U.S. application Ser. No. 14/506,884, now U.S. Pat. No. 9,129,022, filed Oct. 6, 2014, and entitled "METHOD AND SYSTEM FOR LIMITING SHARE OF VOICE OF INDIVIDUAL USERS," which is a continuation of U.S. application Ser. No. 13/921,184, now U.S. Pat. No. 8,856,106, filed. Jun. 18, 2013, and entitled "METHOD AND SYSTEM FOR LIMITING SHARE OF VOICE OF INDIVIDUAL USERS," which is a continuation of U.S. application Ser. No. 13/157,626, filed Jun. 10, 2011, now U.S. Pat. No. 8,473,497, and entitled "METHOD AND ALGORITHM FOR LIMITING SHARE OF VOICE OF INDIVIDUAL USERS," which claims the priority benefit of U.S. Provisional Patent Application No. 61/386,861, filed Sep. 27, 2010 and entitled "METHOD AND ALGORITHM FOR LIMITING SHARE OF VOICE OF INDIVIDUAL USERS," the contents of which are incorporated herein by reference in their entirety.

FIELD

The present disclosure relates generally to publication systems and, in a specific example embodiment, to limiting share of voice of users in a publication system.

BACKGROUND

An online marketplace, such as a classified advertisement or auction marketplace, allows consumers (e.g., individual users) and businesses to list items (e.g., products and services) for purchase. In some environments, the number of businesses placing items for purchase has increased disproportionately versus individual consumers. Furthermore, the businesses typically have resources to ensure that their listings are positioned at a top of a search result set (e.g., paying to be listed higher on the search result set). As a result, a balance between consumer and business listings may not be present in a result set based on a search of the online marketplace.

Additionally, some businesses and consumers tend to post a large number of listings or post listings in blocks. For example, if a consumer has items in ten different colors, the consumer may post ten different listings. These listings may also dominate the search result set and cause an imbalance of listings in the search result set. This may occur, for example, when listings are presented based primarily on the date of the posting of the listings.

BRIEF DESCRIPTION OF DRAWINGS

Various ones of the appended drawings merely illustrate example embodiments of the present invention and cannot be considered as limiting its scope.

DETAILED DESCRIPTION

Figure 1:
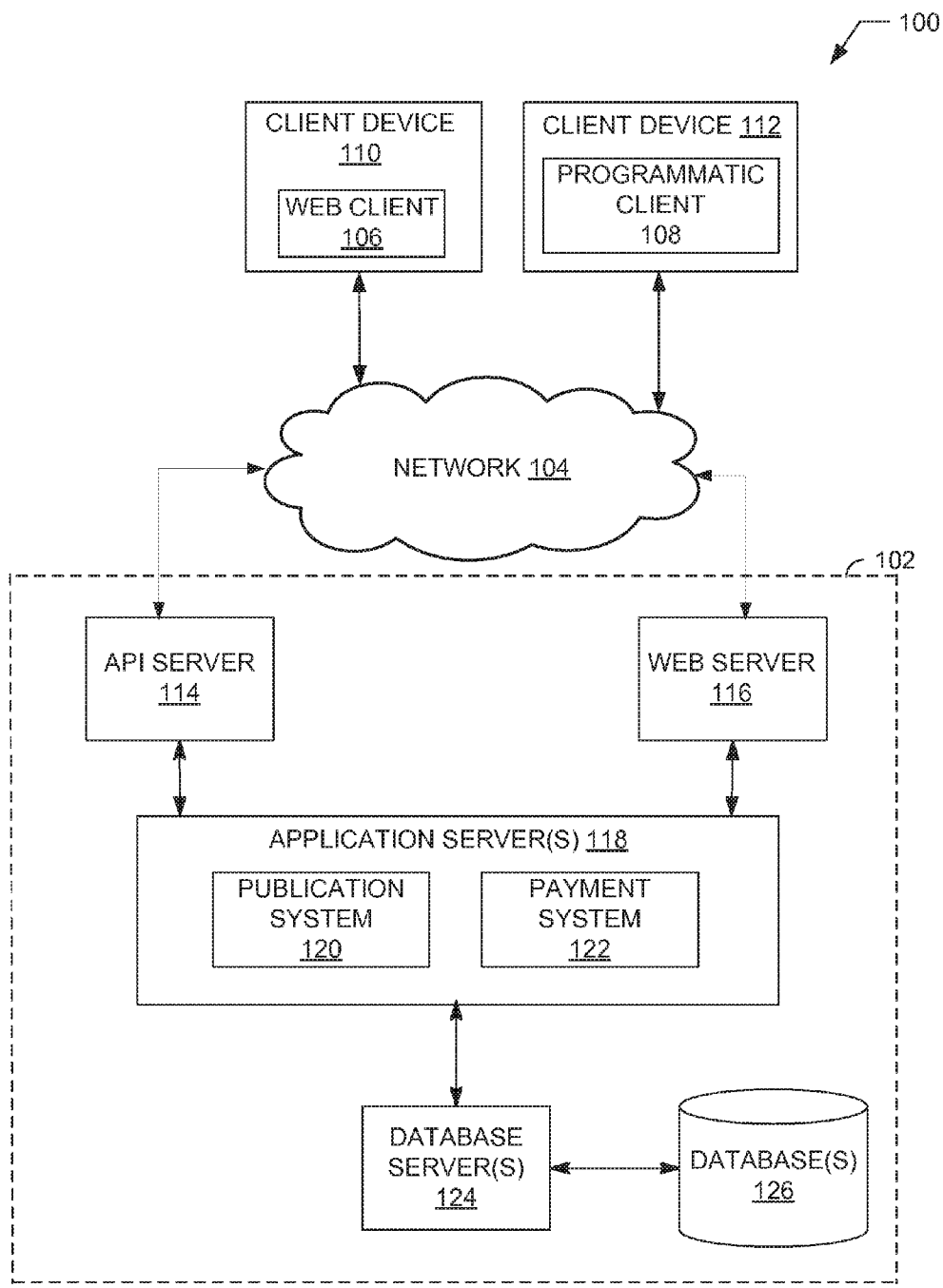
FIG. 1 is a block diagram illustrating an example environment in which embodiments of a system to provide proxy accounts may be used.

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

As used herein, the term "or" may be construed in either an inclusive or exclusive sense. Additionally, although various example embodiments discussed below focus on a payment environment, the embodiments are given merely for clarity in disclosure. Thus, any type of electronic publication, electronic commerce, or electronic business system and method, including various system architectures, may employ various embodiments of the content system and method described herein and be considered as being within a scope of example embodiments. Each of a variety of example embodiments is discussed in detail below.

Example embodiments described herein provide systems and methods to sort listings from a particular user or type of user (e.g., business versus consumer) within a result set such that no single user or type of user dominates top positions in the result set (e.g., the first few pages of the result set or the top 100 results in the result set). In example embodiments, a listing user providing each listing in a result set of a search is identified. Sorting criteria indicating a number of listings a same listing user or type of user is allowed within a number of consecutive listings of the result set are reviewed. Using the sorting criteria, a sorted result set is generated by sorting the plurality of listings in accordance with the sorting criteria. The sorted result set is provided to a searching user.

In example embodiments, one or more listings from the same user or user type may be demoted by the sorting process to a lower position on the result set in order to provide a balance of listings from different users and user types to the searching user. The sorting process may be a seller dominance sorting process, a business/consumer ratio sorting process, or a combination of both. The seller dominance sorting process attempts to balance the result set such that listings from a particular seller do not dominate top positions in the result set. The business/consumer ratio sorting process attempts to balance the result set such that listings from businesses in general do not dominate top positions in the result set.

By using embodiments of the present invention, a user performing a search can be provided results that are more balanced and provide more variety to the searching user. Accordingly, one or more of the methodologies discussed herein may obviate a need for additional searching, which may have the technical effect of reducing computing resources used by one or more devices within the system. Examples of such computing resources include, without limitation, processor cycles, network traffic, memory usage, storage space, and power consumption.

With reference to FIG. 1, an example embodiment of a high-level client-server-based network architecture 100 to provide a sorted result set is shown. A networked system 102, in an example form of a network-server-side functionality, is coupled via a communication network 104 (e.g., the Internet, wireless network, cellular network, or a Wide Area Network (WAN)) to one or more client devices 110 and 112. FIG. 1 illustrates, for example, a web client 106 operating via a browser (e.g., such as the INTERNET EXPLORER® browser developed by Microsoft® Corporation of Redmond, Wash. State), and a programmatic client 108 executing on respective client devices 110 and 112.

The client devices 110 and 112 may comprise a mobile phone, desktop computer, laptop, or any other communication device that a user may utilize to access the networked system 102. In some embodiments, the client device 110 may comprise or be connectable to an image capture device (e.g., camera). The client device 110 may also comprise a voice recognition module (not shown) to receive audio input and a display module (not shown) to display information (e.g., in the form of user interfaces). In further embodiments, the client device 110 may comprise one or more of a touch screen, accelerometer, and GPS device. The client devices 110 and 112 may be a device of an individual user (hereinafter referred to as a "consumer") or business posting listings for items for sale on the network-based marketplace. Alternatively, the client devices 110 and 112 may be a device of a user looking to, for example, purchase an item from a network-based marketplace.

An Application Program Interface (API) server 114 and a web server 116 are coupled to, and provide programmatic and web interfaces respectively to, one or more application servers 118. The application servers 118 host a publication system 120 and a payment system 122, each of which may comprise one or more modules, applications, or engines, and each of which may be embodied as hardware, software, firmware, or any combination thereof. The application servers 118 are, in turn, coupled to one or more database servers 124 facilitating access to one or more information storage repositories or database(s) 126. In one embodiment, the databases 126 are storage devices that store information to be posted to the publication system 120. The databases 126 may also store account information associated with the various users of the networked system 102.

The publication system 120 publishes content on a network (e.g., the Internet). As such, the publication system 120 provides a number of publication and marketplace functions and services to users that access the networked system 102. The publication system 120 is discussed in more detail in connection with FIG. 2. In example embodiments, the publication system 120 is discussed in terms of a marketplace environment. However, it is noted that the publication system 120 may be associated with a non-marketplace environment such as an informational environment.

The payment system 122 provides a number of payment services and functions to users. The payment system 122 allows users to accumulate value (e.g., in a commercial currency, such as the U.S. dollar, or a proprietary currency, such as "points") in accounts, and then later to redeem the accumulated value for products (e.g., goods or services) that are made available via the publication system 120. The payment system 122 also facilitates payments from a payment mechanism (e.g., a bank account, PayPal™, or credit card) for purchases of items via a network-based marketplace. While the publication system 120 and the payment system 122 are shown in FIG. 1 to both form part of the networked system 102, it will be appreciated that, in alternative embodiments, the payment system 122 may form part of a payment service that is separate and distinct from the networked system 102.

While the example network architecture 100 of FIG. 1 employs a client-server architecture, a skilled artisan will recognize that the present disclosure is not limited to such an architecture. The example network architecture 100 can equally well find application in, for example, a distributed or peer-to-peer architecture system. The publication system 120 and payment system 122 may also be implemented as standalone systems or standalone software programs operating under separate hardware platforms, which do not necessarily have networking capabilities.

Figure 2:
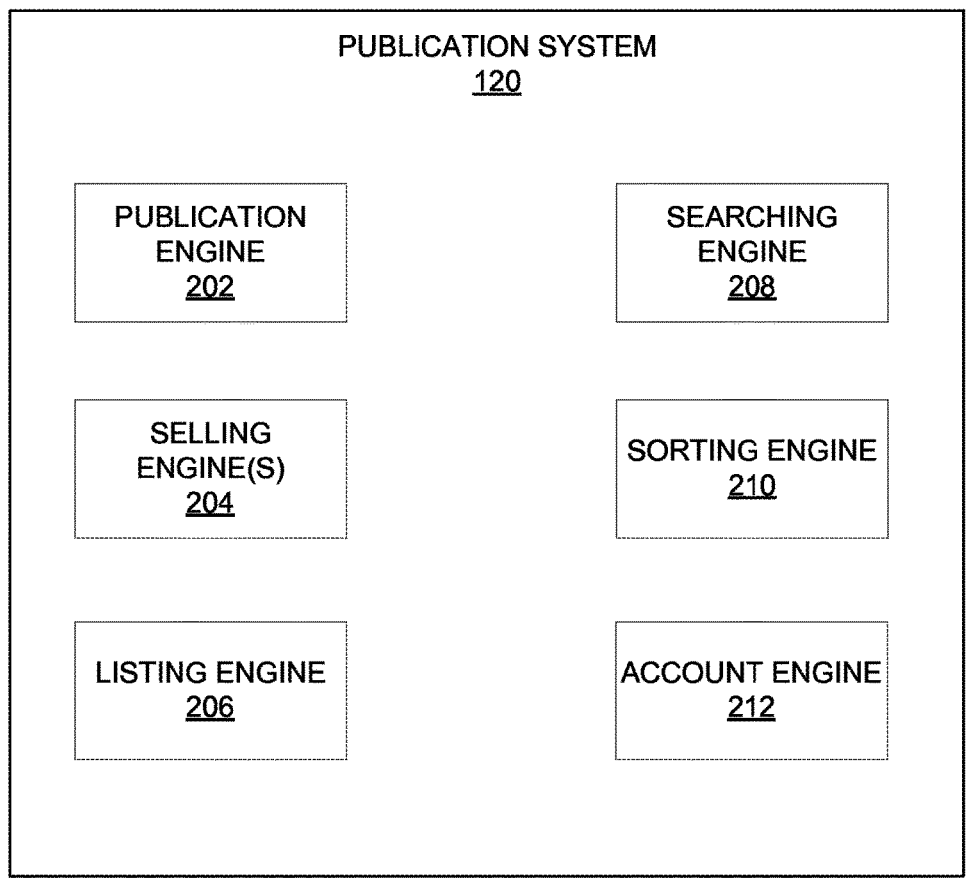
FIG. 2 is a block diagram illustrating an example embodiment of the publication system.

Referring now to FIG. 2, an example block diagram illustrating multiple components that, in one example embodiment, are provided within the publication system 120 of the networked system 102 is shown. The publication system 120 may be hosted on dedicated or shared server machines (not shown) that are communicatively coupled to enable communications between the server machines. The multiple components, themselves, are communicatively coupled (e.g., via appropriate interfaces), either directly or indirectly, to each other and to various data sources, to allow information to be passed between the components or to allow the components to share and access common data. Furthermore, the components may access the one or more database(s) 126 via the one or more database servers 124, both shown in FIG. 1.

In one embodiment, the publication system 120 comprises a network-based marketplace and provides a number of publishing, listing, and price-setting mechanisms whereby a seller (e.g., business or consumer) may list (or publish information concerning) goods or services for sale, a buyer can express interest in or indicate a desire to purchase such goods or services, and a price can be set for a transaction pertaining to the goods or services. To this end, the publication system 120 may comprise at least one publication engine 202 and one or more selling engines 204. In some embodiments, the selling engines 204 may comprise one or more auction engines that support auction-format listing and price setting mechanisms (e.g., English, Dutch, Chinese, Double, Reverse auctions, etc.). The various auction engines may also provide a number of features in support of these auction-format listings, such as a reserve price feature whereby a seller may specify a reserve price in connection with a listing and a proxy-bidding feature whereby a bidder may invoke automated proxy bidding.

A listing engine 206 allows sellers to conveniently author listings of items. In one embodiment, the listings pertain to goods or services that a user (e.g., a seller) wishes to transact via the publication system 120. Each good or service is associated with a particular category. In other embodiments, a user may create a listing that is an advertisement or other form of publication. The listing information may then be stored to one or more storage devices coupled to the publication system (e.g., databases 126).

Searching the network-based publication system 120 is facilitated by a searching engine 208. For example, the searching engine 208 enables keyword queries of listings published via the publication system 120. In example embodiments, the searching engine 208 receives the keyword queries from a device of a user and conducts a review of the storage device storing the listing information. The review will provide a result set of listings that may be sorted and returned to the device of the user. In a further example, a browse module (not shown) of the searching engine 208 allows users to browse various category, catalog, or inventory data structures according to which listings may be classified within the publication system 120. Various other navigation applications within the searching engine 208 may be provided to supplement the searching and browsing applications.

A sorting engine 210 sorts the result set obtained by the searching engine 208. In some embodiments, the result set may be presorted based on a timestamp (e.g., of a posting time) for each listing such that newest listings will appear prior to older listings. The sorting engine 210 sorts the result set based on a user identity linked to each listing in the result set. The sorting engine 210 will be discussed in more detail in connection with FIG. 3.

An account engine 212 manages accounts of users of the publication system 120. In one embodiment, the account engine 212 determines whether the user is a business entity or an individual user (hereinafter referred to as a "consumer"). The designation of the user as a business or consumer is used, in various embodiments, to sort the search result set as will be discussed in more detail below. In example embodiments, the user may explicitly or inherently indicate this distinction when creating an account with the account engine 212. For example, the user may select a preferred title (e.g., Mr., Mrs., Ms.), which may indicate that the user is a consumer. In other embodiments, the distinction may be determined based on attributes of the user and the listings created by the user. For example, if the user purchases a feature that enables the user to place a URL on their listing, this may be an indication that the user is a business (e.g., the URL is likely a link to the business' website). In another embodiment, the account engine 212 may review the listings that the user has posted and determine whether the user sells a large quantity of new items or provides for shipping of items (instead of local pick-up). These may be indicators that the user is a business entity.

The account engine 212 assigns every user on the publication system 120 a user identifier (UID). When the user creates a listing, the UID for the user may be automatically assigned or linked to the listing (e.g., by the listing engine 206 or the account engine 212). In some embodiments, a business user identifier (business UID) may be assigned or mapped to business entities using the publication system 120. The business LAD may be used in lieu of, or in addition to, the UM. In one embodiment, the same business UID may be mapped for all business entities using the publication system 120. By mapping the same business UID to all business entities, shares of business listings may be reduced in the top results returned in a sorted result set as will be discussed further below. In further embodiments, the same business UID may be assigned to businesses in a same category, location, or any other grouping criteria.

Although the various components of the publication system 120 have been defined in terms of a variety of individual modules and engines, a skilled artisan will recognize that many of the items can be combined or organized in other ways. Furthermore, not all components of the publication system 120 have been included in FIG. 2. In general, components, protocols, structures, and techniques not directly related to functions of example embodiments (e.g., dispute resolution engine, loyalty promotion engine, reputation engines, listing management engines, etc.) have not been shown or discussed in detail. The description given herein simply provides a variety of example embodiments to aid the reader in an understanding of the systems and methods used herein.

Figure 3:
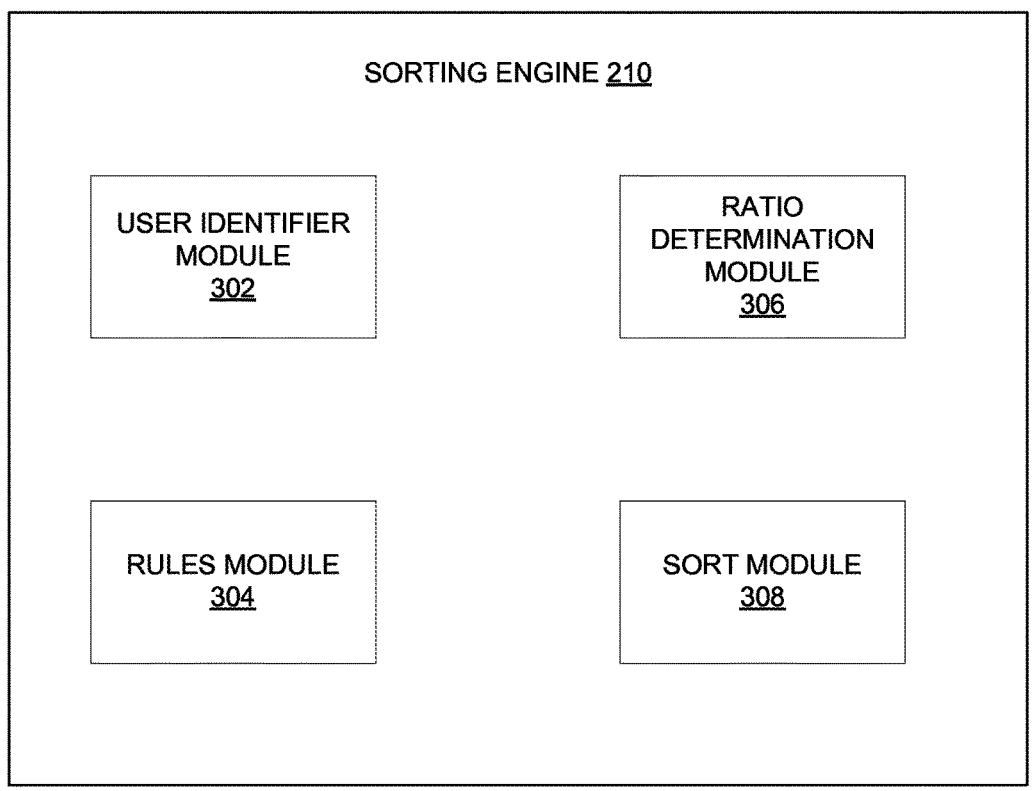
FIG. 3 is a block diagram illustrating an example embodiment of a sorting engine of the publication system.

Referring now to FIG. 3, an example block diagram of the sorting engine 210 is shown. In example embodiments, the sorting engine 210 comprises a user identifier module 302, a rules module 304, a ratio determination module 306, and a sort module 308 communicatively coupled together. In alternative embodiments, one or more of the modules depicted within the sorting engine 210 may be located within another component of the publication system 120, the functions of the modules may be combined within a single module, or the functions of the modules may be separated into multiple modules The user identifier module 302 determines user identifiers (UIDs) linked to each listing in a result set. In example embodiments, the user identifier module 302 reviews the result set obtained by the searching engine 208 and determines the UID for each listing in the result set. The UID may then be used by the other modules of the sorting engine 210 to sort the result set. For example, by mapping the same business UID to all business entities, shares of business listings may be reduced in the top results returned in a sorted result set as will be discussed further below.

The rules module 304 manages the sort rules, which include sorting values (e.g., default or predetermined values or thresholds used for sorting the result set). The sort rules and sorting values may be defined by an administrator of the publication system 120 and periodically readjusted or updated. Alternatively, one or more of the sort rules or sorting values may be a default. In example embodiments, the rules module 304 may include a sort order rule having a sort order value V. The sort order value V indicates a maximum number of listings to be sorted in the result set. For example, the sort order value V may be set to 300. When the search result set is obtained by the searching engine 208, 500 listings may be returned in the result set. However, a requester (e.g., buyer) is likely to only review the first few pages of the result set. The first few pages may constitute the first 300 listings, in this example. Therefore, based on the sort order value V is 300, only 300 listings will be sorted according to example embodiments. The remaining 200 listings will be presented unsorted or presorted according to, for example, their timestamps (e.g., newest first).

The sort rules may further include a distance rule having a listing distance value D that defines a minimum distance between listings from a same seller (e.g., having the same UID) used in a seller dominance sorting process. For example, the listing distance value D may be set to three. The sort module 308 will scan through the result set, which may be presorted by timestamp, and when a listing from a same seller has less than three listings from other sellers in between, the second listing from the same seller will be pushed down (demoted) on the sorted result list so that there are at least three listings from other sellers in between. However, if the distance between any two listings from the same seller is greater than three, the sort module 308 may leave the listings in place (or move the listing up if the listing is used to increase a distance between listings from another seller).

The sort rules may further include a sort size rule including a sort size value S that defines a maximum number of consecutive listings from a same seller. The sort size value S may be used in the seller dominance sorting process. For example, if the sort size value S is set to two and the distance value D is three, the sort module 308 allows up to two consecutive listings from the same seller to be presented in the result set. If a third consecutive listing is detected, the third consecutive listing will be pushed down (demoted) on the sorted result set a distance of three based on the distance value D.

An alternative to the distance and sort rules is a listing number constraint rule having a constraint distance value N and a constraint size value M. The constraint size value M indicates a maximum number of same-seller listings allowed in N number of listings. For example if the constraint distance value N is five (5) and the constraint size value M is two (2), then for every five listings of the result set, there can be at most two listings from the same seller. The listings from the same seller may be consecutive or be in any position relative to each other within the constraint size value.

The rules module 304 may further include a time period rule. One example of a time period rule is an end of day rule. When the end of day rule is active, listings may not be pushed down or demoted past the beginning of the day that the listings are published to the publication system 120. The activation of the end of day rule may result in blocks of listings from the same seller or same type of sellers (e.g., businesses) at the end of the sorted result set for each day. For example, a listing that is posted at 6:47 pm on March $10^{th}$ will not be demoted on the result set beyond any listings having a post time of 12:00 am on March $10^{th}$. Alternative embodiments may contemplate use of any period of time (e.g., end of week, 12 hour period) for the time period rule.

In example embodiments, the ratio determination module 306 determines a ratio distance L used in a business/consumer ratio sorting process. A purpose of using the ratio distance L is to insure that the number of business listings (B) to consumer listings (C) shown in the top sorted results is similar to a ratio of business listings to consumer listings in the result set. Assume R=ratio of B:C in the result set, and β is a ratio size value indicating a number of business listings (B) allowed per (business to consumer)/(consumer to consumer) ratio. β is a configurable value, which is stored with the other rules and values and is accessible by the rules module 304 or the ratio determination module 306. In real time, the ratio determination module 306 finds X such that R=β:Z=B:C. Thus, Z=β(C/B) and X=roundup(Z) to a whole number. Then, L can be determined from [max(β,X)+β].

For example, if the sort order value V=300, then the first 300 results obtained by the searching module 208 are reviewed to determine the number of business listings (B) and number of consumer listings (C). Assuming that there are 90 business listings and 210 consumer listing (e.g., R=B/C=90/210) and that β is set to two (2), then R=β/Z=0.428. As a result, Z=β(1/R)=2(2.34)=4.68. Since X=roundup(Z), X=5. Therefore, L=[max(2,5)+2] is equal to seven (7). This indicates that for every seven (7) listings, there may be at most two (2) business listings (B).

In another example, if the result set returns 14 business listings (B) and 13 consumer listings (C) and β=2, then Z=1.86 and X=2. Therefore, L=[max(2,2)+2)] is equal to four (4). Therefore, for every four (4) listings, there may be at most two (2) business listings (B).

The sort module 308 sorts the result set based on a selected sorting mechanism to generate a sorted result set. The sorting may be based on a seller dominance sorting process, a business/consumer ratio sorting process, or a combination thereof. In some embodiments, the searching user (e.g., buyer) may select one or more sorting processes to be applied to their search result. In other embodiments, a default sorting process or combination sorting process may be enabled. Based on the selected sorting process, the sort module 308 receives rules and sorting values (e.g., from the rules module 304) or receives the ratio distance L (e.g., from the ratio determination module 306) and sorts the result set accordingly.

Figure 4:
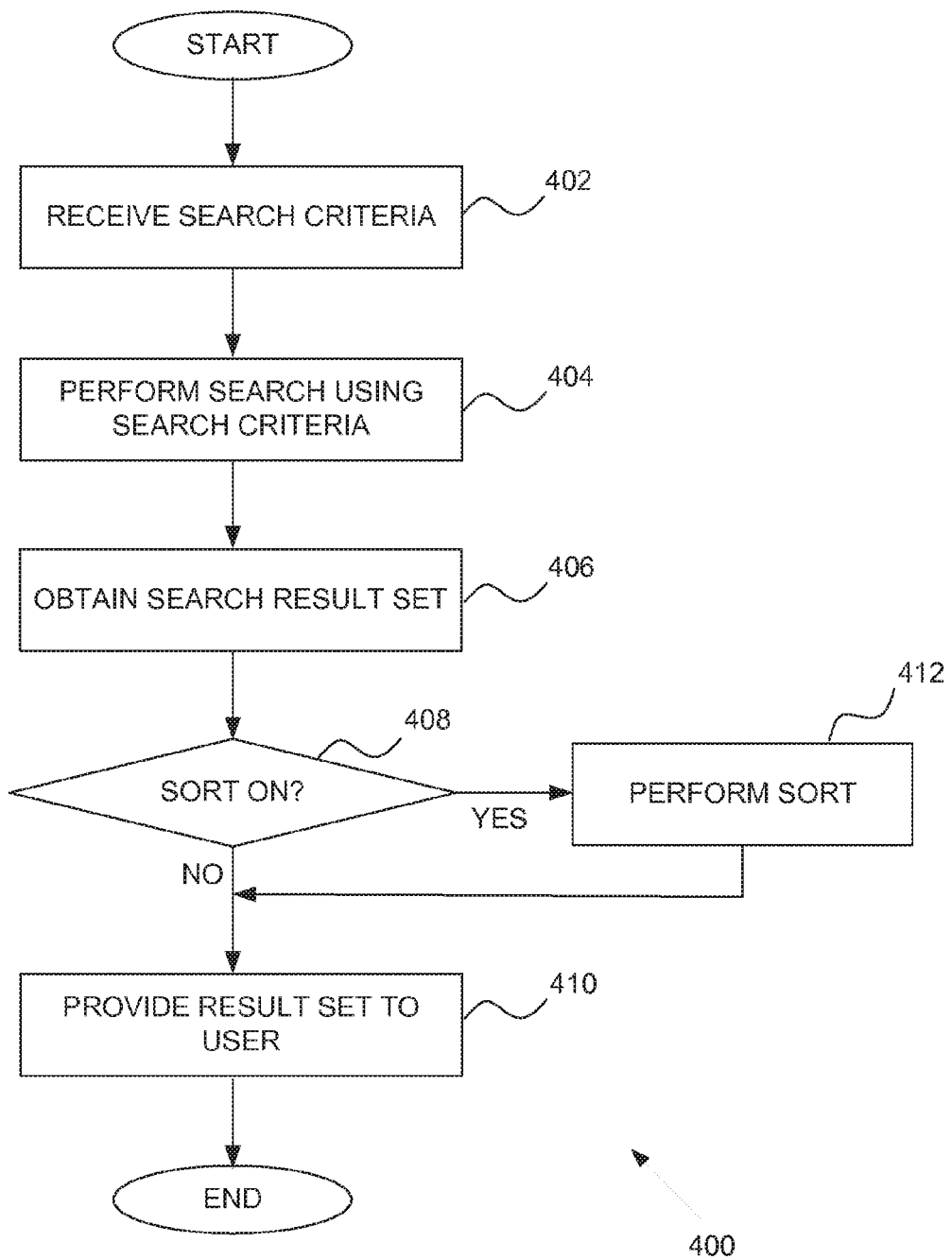
FIG. 4 is a flow diagram of an example high-level method for providing sorted search results.

FIG. 4 is a flow diagram of an example high-level method 400 for providing sorted search results. In operation 402, search criteria are received from a searching user. The search criteria may comprise one or more keywords for an item of interest to the search user.

In operation 404, the searching engine 208 performs a search using the search criteria. In example embodiments, the searching engine 208 may access a storage device (e.g., databases 126) and use the searching criteria to find one or more listings that satisfy the search criteria.

The search result set is obtained in operation 406 by the sorting engine 210 from the searching engine 208. The sorting engine 210 may then perform a sort on the result set. It is noted that the result set may be automatically presorted based on the timestamp associated with each listing in the result set. For example, newer listings of the result set may be positioned higher on the result set than older listings. In other embodiments, the timestamp presort may not be performed or may be replaced by a different presorting method. For example, the result set may be presorted based on relevance, lowest price, or proximity to the searching user.

In operation 408, a determination is made whether sorting, as provided by example embodiments, is enabled. If sorting is not enabled, then the result set is provided to a device of the searching user in operation 410. However, if sorting is enabled, then the sort is performed in operation 412. The sorting process performed in operation 412 may be a seller dominance sorting process, a business/consumer ratio sorting process, or a combination of the two processes. In one embodiment, the administrator of the publication system 120 may determine which sorting process is to be used. In an alternative embodiment, the searching user may specify which sorting process is to be used or be allowed to turn off any sorting process set by the publication system 120. The seller dominance sorting process will be discussed in more detail in connection with FIG. 5a and FIG. 5b, while the business/consumer sorting process will be discussed in more detail in connection with FIG. 6a and FIG. 6b.

Figure 5A:
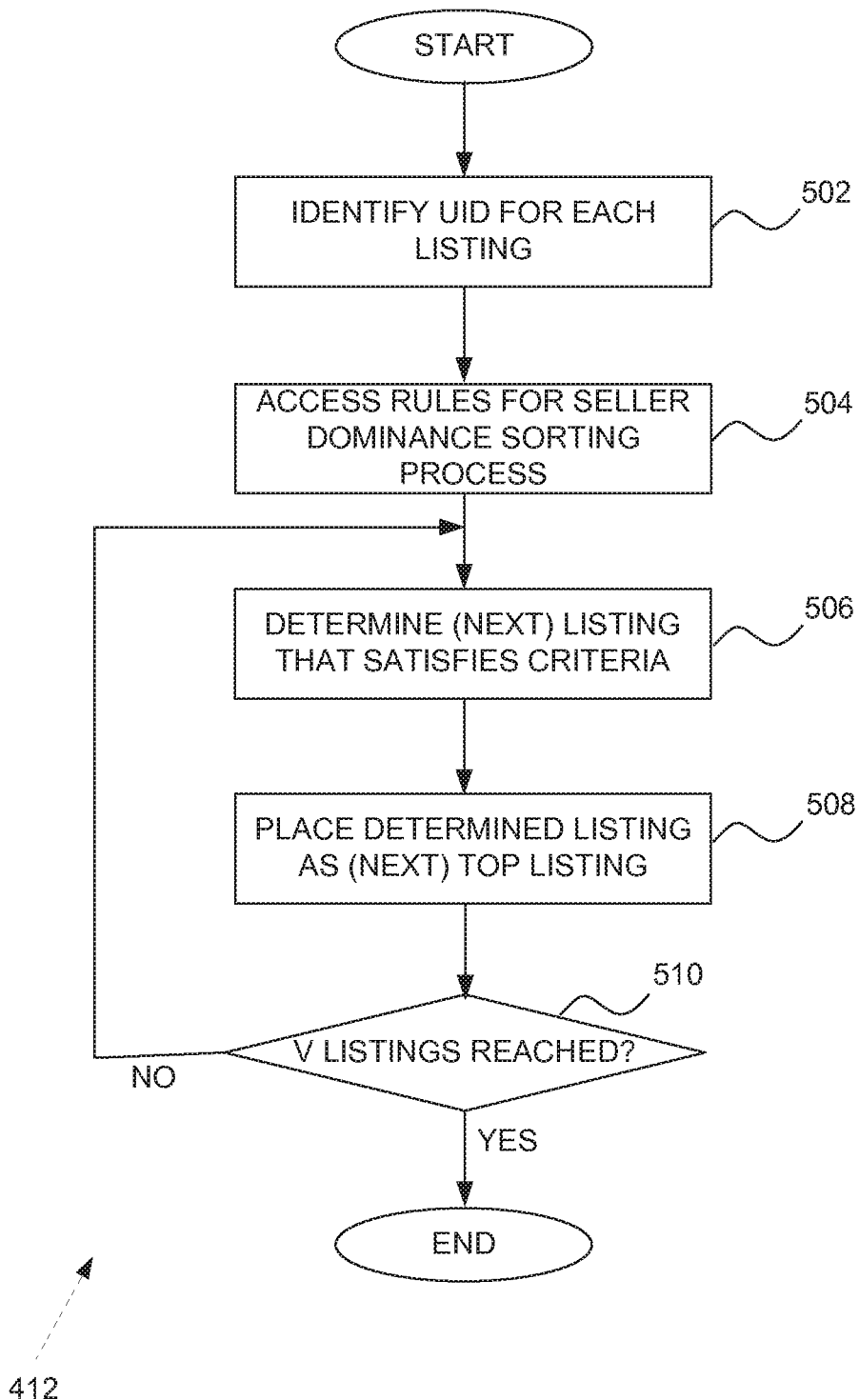
FIG. 5a is a flow diagram of an example method for sorting using a seller dominance sorting process.

FIG. 5a is a flow diagram of an example method (e.g., operation 412) for sorting using a seller dominance sorting process. The seller dominance sorting process attempts to balance the result set such that listings from a particular seller do not dominate top positions in the result set. In operation 502, a user identifier (UID) for each listing is determined. In example embodiments, the user identifier module 302 reviews the result set obtained by the searching engine 208 and determines the UID for each listing in the result set. In some embodiments, a business user identifier (business UID) may be assigned or mapped to all business entities using the publication system 120. By mapping the same business UID to all business entities, shares of business listings, in general, may be reduced in the top results returned in a sorted result set as will be discussed further below.

In operation 504, the sort rules for the seller dominance sorting process are accessed by the rules module 304. Associated sorting values based on the sort rules may be retrieved by the rules module 304 to be used by the sort module 308. In example embodiments, the rules module 304 retrieves the sort order value V, the listing distance value D indicating a minimum distance between listings from a same seller (e.g., having the same UID), and a sort size value S indicating a maximum number of consecutive listings from the same seller. Alternatively, the rules module 304 may retrieve the listing number constraint rule having a constraint distance value N and a constraint size value M.

Using the sorting values, a listing that satisfies the sorting criteria (e.g., the sort rules and the sorting values) is determined in operation 506. In example embodiments, the sort module 308 traverses the result set, which may be presorted by timestamp, and finds a first listing that satisfies the sorting criteria. This first listing is positioned as a top listing in the sorted result set in operation 508. In practice, the first several listings of the search result set will likely satisfy the sorting criteria and their position will not be moved. However, subsequent listings, based on the timestamp, may violate one or more of the sorting criteria and may be pushed down on the result set. Alternatively, other listings may be pushed up (or elevated) in the sorted result set to satisfy the sorting criteria.

In operation 510, a determination is made as to whether the maximum number of listings to be sorted based on the sort order value V is reached. If the maximum number has not been reached, then the method returns to operation 506 to determine a next listing that satisfies the sorting criteria and positions the next listing at a next top listing in the sorted result set in operation 508.

Figure 5B:
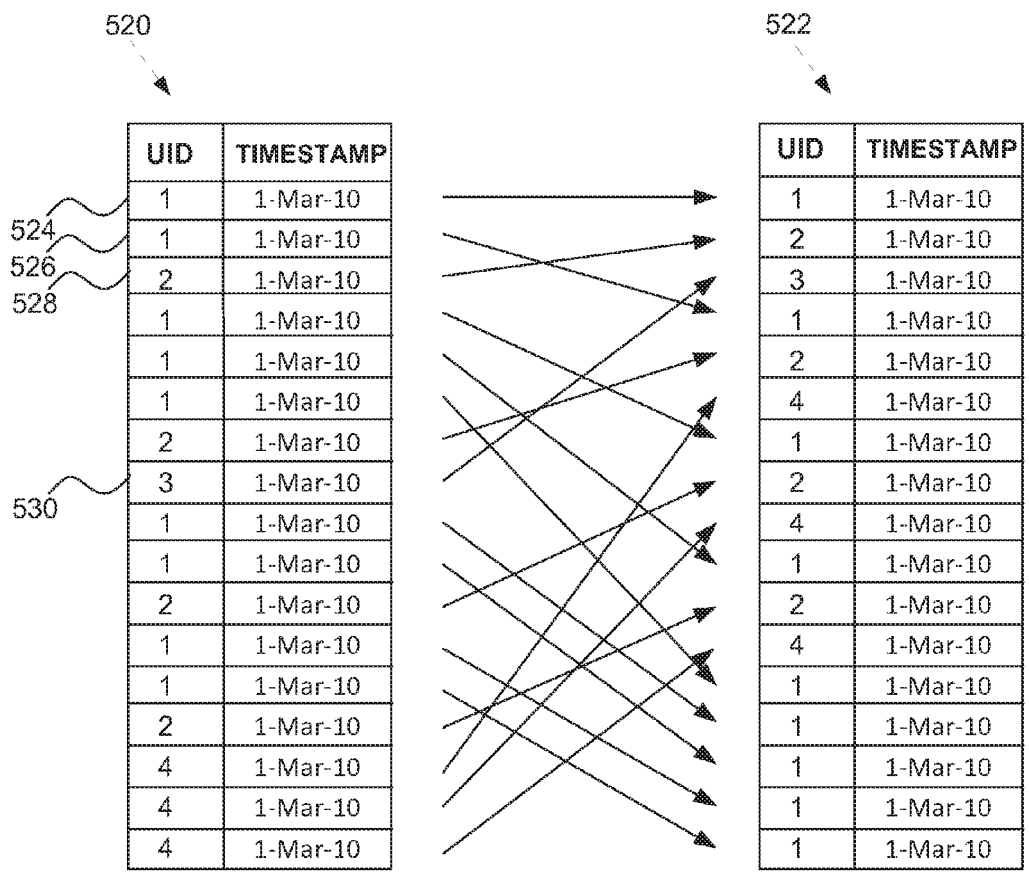
FIG. 5b is an example illustrating a seller dominance sorting process.

FIG. 5b is an example illustrating the seller dominance sorting process of FIG. 5a. As shown, a result set 520 is obtained from the searching engine 208. Each row of the result set indicates a corresponding listing, whereby a is identified in a first column and a timestamp is indicated in a second column. While the timestamp only shows the date, it is noted that the timestamp may comprise a time (e.g., down to a second or smaller) that the listing was posted to the publication system 120. The result set 520 may be presorted based on the timestamp.

The result set 520 is sorted into the sorted result set 522 based on the sort rules and sorting values (e.g., collectively referred to as "sorting criteria") established for the seller dominance sorting process. In the example of FIG. 5b, the listing distance value D indicates a minimum distance between listings from a same seller is two (2), and a sort size value S indicates a number of consecutive listings allowed for a same seller is one (1). It is noted that some embodiments may not utilize the sort size value S and may merely have a default of 1 listing allowed between listing distance value D. The sort order value V (e.g., V=300) may not be important in this example since the result set comprises only 17 listings. Alternatively, the example of FIG. 5b may be sorted based on a constraint distance value N being three (3) and a constraint sort value M being one (1).

Applying the method of FIG. 5a, the first listing 524 from seller1 satisfies the sorting criteria, and thus remains in a first position in the sorted result set 522. The second listing 526, which is also from seller1, is moved down (e.g., held and inserted later in the sorted result set) until it meets the sorting criteria (e.g., satisfies D=2). Conversely, a third listing 528 is moved up into a second position in the sorted result set 522 as a next top most listing that does not violate the seller dominance criteria. Similarly, listing 530 from seller3 is moved up to a third position in the sorted result set 522 since it is a next top most listing that does not violate the seller dominance criteria. Because the end of day rule is active, the sorted result set may have a block of listings from the same seller at the bottom of the sorted result set 522.

Figure 6A:
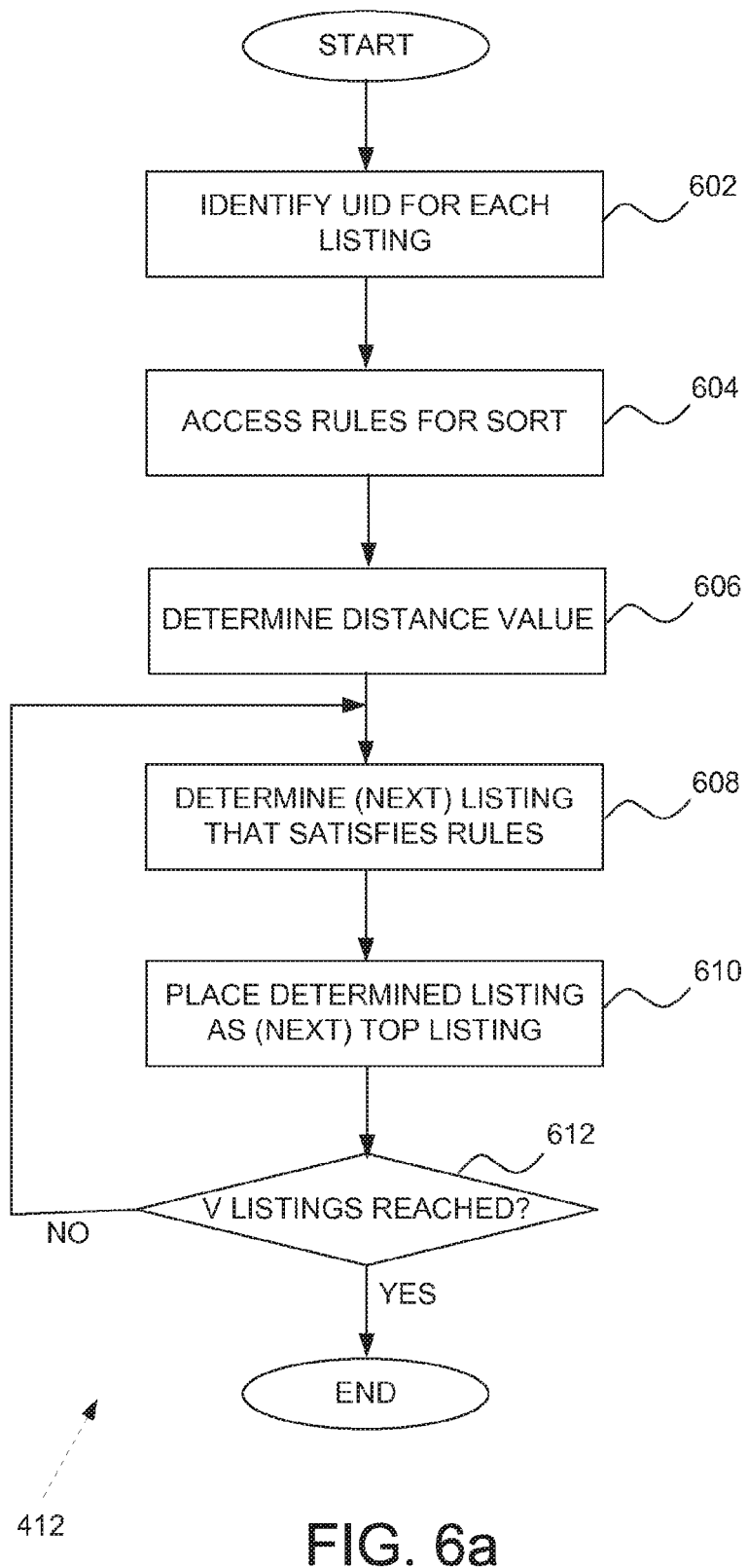
FIG. 6a is a flow diagram of an example method for sorting using a business/consumer ratio sorting process.

FIG. 6a is a flow diagram of an example method for sorting using a business/consumer ratio sorting process. The business/consumer ratio sorting process attempts to balance the result set such that listings from business entities do not dominate top positions in the result set. In operation 602, a user identifier (UID) for each listing is determined. In example embodiments, the user identifier module 302 reviews the result set obtained by the searching engine 208 and determines the UID for each listing in the result set. In some embodiments, a same business user identifier (business UID) may be assigned or mapped to all business entities using the publication system 120. By mapping the same business UID to all business entities, shares of business listings may be reduced in the top results returned in a sorted result set.

In operation 604, the criteria for the business/consumer ratio sorting process are accessed by the rules module 304. In example embodiments, the rules module 304 retrieves the maximum number of listings to be sorted in the result set, V, and a number of business listings (B) allowed per (business to consumer)/(consumer to consumer) sort value $\beta$.

Using the sorting values retrieved by the rules module 304, a ratio distance L based on a ratio of business listings to consumer listings is determined in operation 606. In example embodiments, the ratio determination module 306 determines the ratio distance L. A purpose of using the ratio distance L is to insure that the number of business listings (B) to consumer listings (C) shown in the top sorted results is similar to a ratio of business listings to consumer listings in the overall result set. Assuming R=ratio of B:C in the result set and using $\beta$, the ratio determination module 306 finds X such that R=$\beta$:Z and X=roundup(Z) to a whole number. Then, L can be determined from $[\max(\beta,X)+\beta]$. The calculation of L may occur in real time and on-the-fly based on the result set.

A listing that satisfies the criteria is determined in operation 608. In example embodiments, the sort module 308 traverses the result set, which is presorted by timestamp, and finds a first listing that satisfies the sorting criteria (e.g., V, ratio size value $\beta$, and ratio distance value L). This first listing is positioned as a top listing in the result set in operation 610. In practice, the first several listings of the search result will likely satisfy the criteria and their positions will not be moved. However, subsequent listings, based on the timestamp, may violate one or more of the criteria and will be pushed down on the result set.

In operation 612, a determination is made as to whether the maximum number of listings to be sorted, V, is reached. If the maximum number has not been reached, then the method returns to operation 608 to determine a next listing that satisfies the sorting criteria and positions the next listing at a next top listing in the sorted result set in operation 610.

Figure 6B:
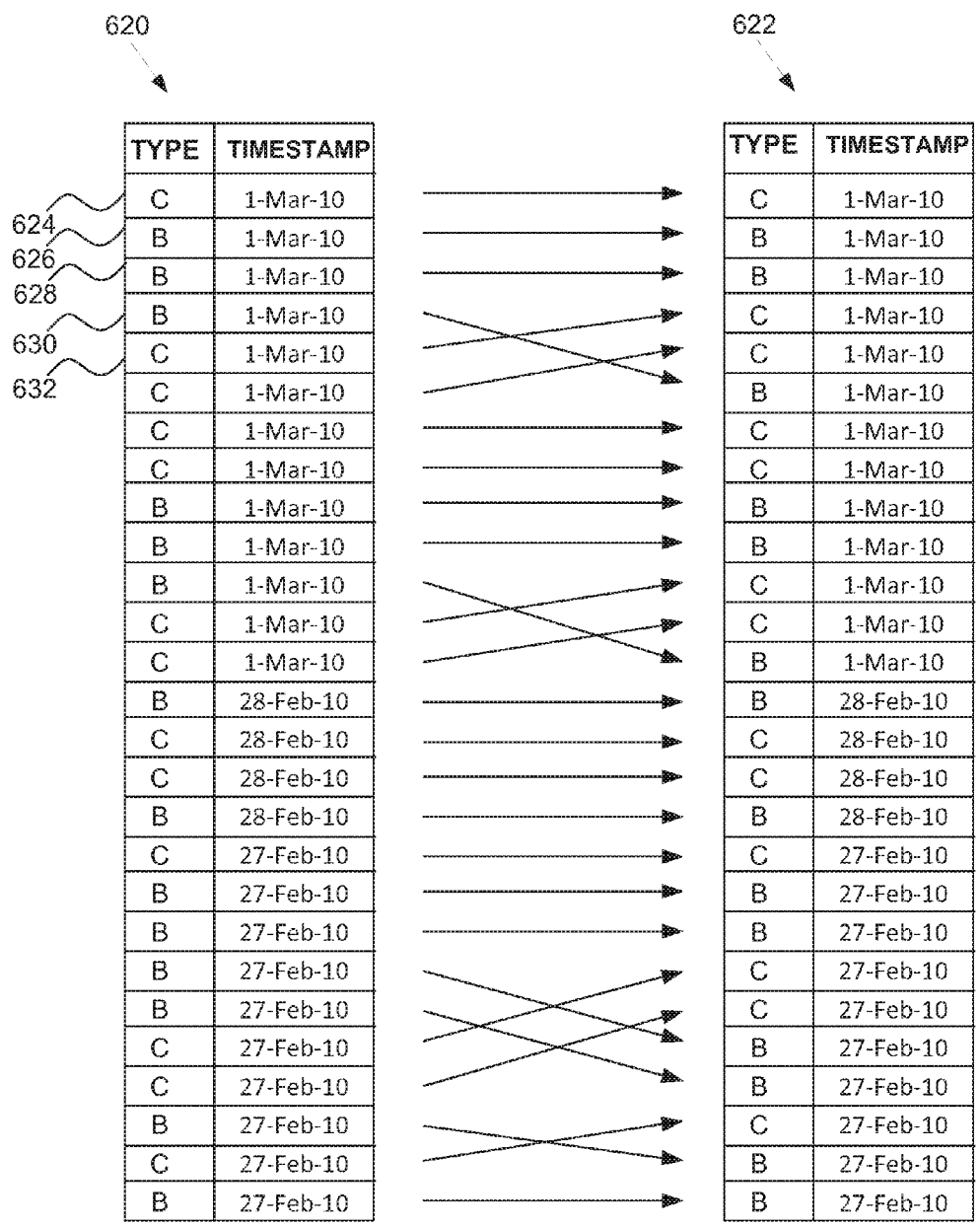
FIG. 6b is an example illustrating a business/consumer ratio sorting process.

FIG. 6b is an example illustrating the business/consumer ratio sorting process of FIG. 6a. As shown, a result set 620 is obtained from the searching engine 208. Each row of the result set indicates a corresponding listing, whereby a type (e.g., business or consumer) is identified in a first column and a timestamp is indicated in a second column. The type may be determined by the UID associated with each listing.

While the timestamp only shows the date, it is noted that the timestamp may comprise a time (e.g., down to a second or smaller) that the listing was posted to the publication system 120. The result set 620 may be presorted based on the timestamp.

The result set 620 is sorted into the sorted result set 622 based on the sort rules and sorting values (e.g., collectively referred to as "sorting criteria") established for the business/consumer ratio sorting process. In the example of FIG. 6b, the result set 620 comprises 14 business listings (B) and 13 consumer listings (C). Assuming $\beta=2$ (e.g., number of business listings allowed within L), then $Z=1.86$ and $X=2$. Therefore, $L=[\max(2,2)+2]$ is equal to four (4). Therefore, for every four (4) listings, there may be at most two (2) business listings (B).

Applying the method of FIG. 6a, the first listing 624 from a consumer satisfies the sorting criteria, and thus remains in a first position in the sorted result set 622. The same holds true for the second listing 626 and third listing 628, both from businesses. The fourth listing 630, also from a business, violates the sorting criteria since it there would be more than two business listings for every four listings. As such, the fourth listing 630 is moved down (e.g., held and inserted later in the sorted result set) until it meets the sorting criteria. Conversely, a fifth listing 632 is moved up into a fourth position in the sorted result set 622 as a next top most listing that does not violate the sorting criteria. Because the end of day rule is enabled, the sorting of the listing will not go beyond the beginning of the day in which the listing was posted. Thus, all sorted listings for March $1^{st}$ are presented before all sorted listings for February $28^{th}$, and so on. As a result, there may be listings at the bottom of each day that violate the sorting criteria. The sorting process continues until V is reached or the result set is exhausted, whichever occurs first.

If both sorting methods are enabled, then both the seller dominance sorting process and the business/consumer ratio sorting process are performed. In example embodiments, each listing is evaluated using both sorting processes before being eligible for insertion into the sorted result set. The enabling of one or both processes may be triggered by one or more switches in the sorting engine 210 in accordance with one embodiment.

While example embodiments have been discussed that sort based on a business and consumer distinction, alternative embodiments may contemplate sorting based on other distinctions (e.g., user typology). For example, sorting may be based on consumer type (e.g., high volume consumer versus periodic consumer), business type, location of users, and user ratings.

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmissions (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Medium

Figure 7:
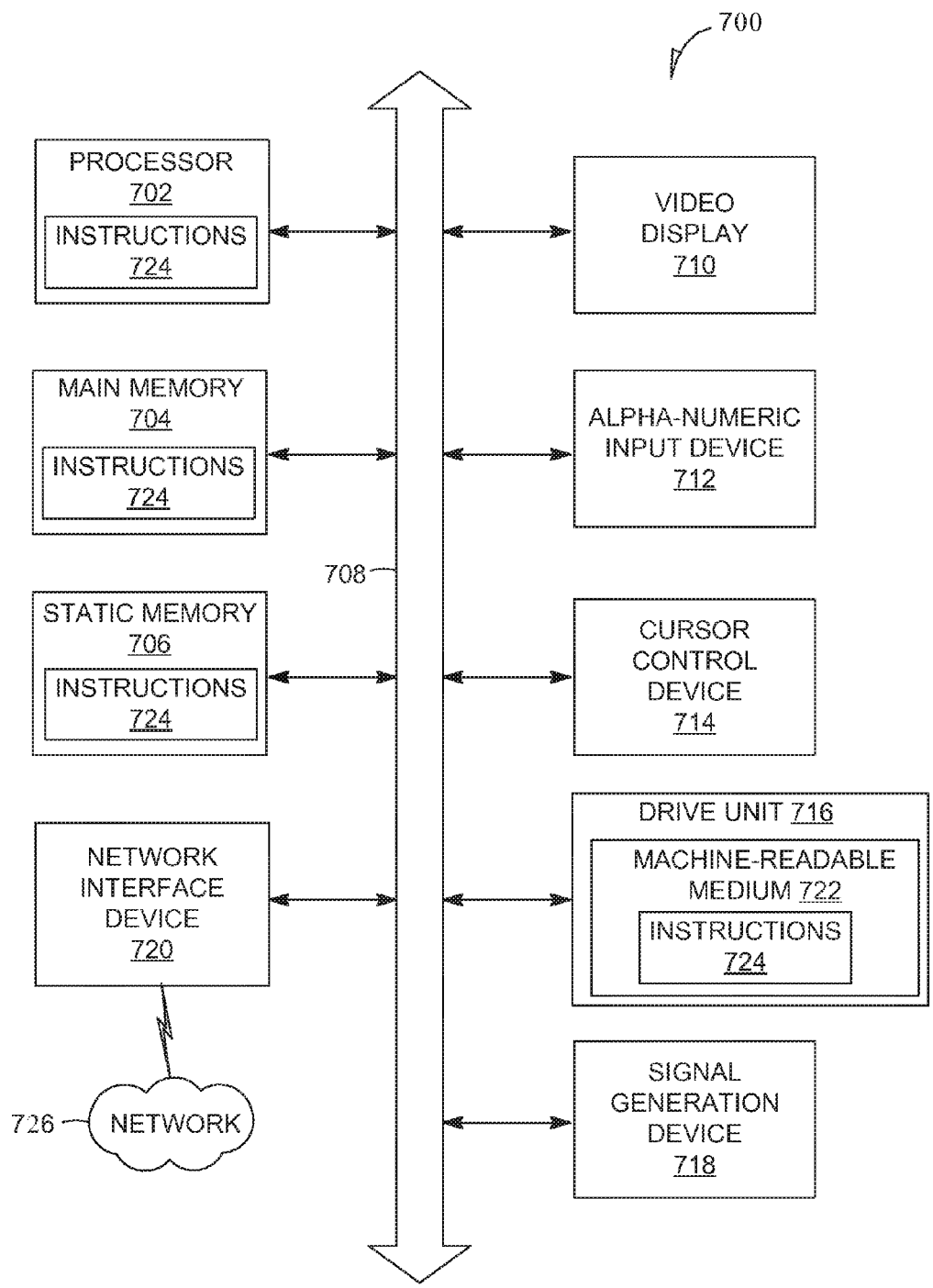
FIG. 7 is a simplified block diagram of a machine in an example form of a computing system within which a set of instructions for causing the machine to perform any one or more of the methodologies discussed herein may be executed.

With reference to FIG. 7, an example embodiment extends to a machine in the example form of a computer system 700 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine.

Further, while only a single machine is illustrated, the term "machine" shall also be taken to include any collection of machines that individually or jointly execute a set (or multiple sets) of instructions to perform any one or more of the methodologies discussed herein.

The example computer system 700 may include a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). In example embodiments, the computer system 700 also includes one or more of an alpha-numeric input device 712 (e.g., a keyboard), a user interface (UI) navigation device or cursor control device 714 (e.g., a mouse), a disk drive unit 716, a signal generation device 718 (e.g., a speaker), and a network interface device 720.

Machine-Readable Storage Medium

The disk drive unit 716 includes a machine-readable storage medium 722 on which is stored one or more sets of instructions 724 and data structures (e.g., software instructions) embodying or used by any one or more of the methodologies or functions described herein. The instructions 724 may also reside, completely or at least partially, within the main memory 704 or within the processor 702 during execution thereof by the computer system 700, with the main memory 704 and the processor 702 also constituting machine-readable media.

While the machine-readable storage medium 722 is shown in an example embodiment to be a single medium, the term "machine-readable storage medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory; including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 724 may further be transmitted or received over a communications network 726 using a transmission medium via the network interface device 720 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
for each publication of a plurality of publications in a set, identifying an entity associated with the publication;
generating, by a hardware processor, a single search results page with a sorted set by sorting the plurality of publications from a plurality of entities in the set using a sorting criterion such that each publication from a same entity in the sorted set is positioned based on the sorting criterion by shifting a particular publication from the same entity to one or more different positions on the single search results page in order to satisfy the sorting criterion the sorting criterion indicating a number of publications from the same entity is allowed within a number of consecutive publications on the single search results page; and
causing the single search results page with the sorted set to be displayed in a user interface to a searching user.

2. The method of claim 1, wherein the sorting criterion comprises a size criterion indicating a number of consecutive publications from the same entity is allowed in the set.

3. The method of claim 1, wherein the sorting criterion comprises a distance rule that defines a minimum distance between each of a maximum number of publications from a same type of entity.

4. The method of claim 1, wherein the sorting criterion comprises a rule that defines a maximum number of publications from a same type of entity allowed within a predetermined number of the plurality of publications in the set.

5. The method of claim 1, wherein the sorting criterion comprises a distance rule indicating a distance value that defines a minimum distance between publications from the same entity.

6. The method of claim 1, wherein the sorting criterion comprises a time period rule that restricts sorting past a given time period reflected by a timestamp of each publication in the set.

7. The method of claim 1, further comprising calculating a ratio distance value, the ratio distance value defining a number of publications in which a maximum number of publications from the same entity is allowed based on a ratio of business publications to consumer publications in the set.

8. The method of claim 1, wherein the identifying the entity comprises determining a user identifier linked to each of the plurality of publications in the set.

9. The method of claim 1, further comprising assigning a plurality of business users a same user identifier resulting in the plurality of business users being considered as a single entity in the generating of the sorted set.

10. A system comprising:
one or more hardware processors; and
a hardware storage device storing instructions that, when executed by the one or more hardware processors, configure the one or more hardware processors to perform operations comprising:
for each publication of a plurality of publications in a set, identifying an entity associated with the publication;
generating, by a hardware processor a single search results page with a sorted set by sorting the plurality of publications from a plurality of entities in the set using a sorting criterion such that each publication from a same entity in the sorted set is positioned based on the sorting criterion by shifting a particular publication from the same entity to one or more different positions on the single search results page in order to satisfy the sorting criterion, the sorting criterion indicating a number of publications from the same entity is allowed within a number of consecutive publications on the single search results page; and
causing the single search results page with the sorted set to be displayed in a user interface to a searching user.

11. The system of claim 10, wherein the sorting criterion comprises a size criterion indicating a number of consecutive publications from the same entity is allowed in the set.

12. The system of claim 10, wherein the sorting criterion comprises a distance rule that defines a minimum distance between each of a maximum number of publications from a same type of entity.

13. The system of claim 10, wherein the sorting criterion comprises a rule that defines a maximum number of publications from a same type of entity allowed within a predetermined number of the plurality of publications in the set.

14. The system of claim 10, wherein the sorting criterion comprises a distance rule indicating a distance value that defines a minimum distance between publications from the same entity.

15. The system of claim 10, wherein the sorting criterion comprises a time period rule that restricts sorting past a given time period reflected by a timestamp of each publication in the set.

16. A hardware storage device storing instructions that, when executed by the at least one processor of a machine, cause the machine to perform operations comprising:
for each publication of a plurality of publications in a set, identifying an entity associated with the publication;
generating, by a hardware processor a single search results page with a sorted set by sorting the plurality of publications from a plurality of entities in the set using a sorting criterion such that each publication from a same entity in the sorted set is positioned based on the sorting criterion by shifting a particular publication from the same entity to one or more different positions on the single search results page in order to satisfy the sorting criterion, the sorting criterion indicating a number of publications from the same entity is allowed within a number of consecutive publications on the single search results page; and
causing the single search results page with the sorted set to be displayed in a user interface to a searching user.

17. The hardware storage device of claim 16, wherein the sorting criterion comprises a size criterion indicating a number of consecutive publications from the same entity is allowed in the set.

18. The hardware storage device of claim 16, wherein the sorting criterion comprises a distance rule that defines a minimum distance between each of a maximum number of publications from a same type of entity.

19. The hardware storage device of claim 16, wherein the sorting criterion comprises a rule that defines a maximum number of publications from a same type of entity allowed within a predetermined number of the plurality of publications in the set.

20. The hardware storage device of claim 16, wherein the sorting criterion comprises a distance rule indicating a distance value that defines a minimum distance between publications from the same entity.

* * * * *

UNITED STATES PATENT AND TRADEMARK OFFICE
CERTIFICATE OF CORRECTION

PATENT NO. : 9,946,774 B2
APPLICATION NO. : 15/450752
DATED : April 17, 2018
INVENTOR(S) : Robin Johan Schuil et al.

It is certified that error appears in the above-identified patent and that said Letters Patent is hereby corrected as shown below:

In the Specification

In Column 1, Line 18, delete "filed." and insert -- filed --, therefor.

In the Claims

In Column 14, Line 53, in Claim 1, after "criterion" insert -- , --.
In Column 15, Line 33, in Claim 10, after "processor" insert -- , --.
In Column 16, Line 21, in Claim 16, after "processor" insert -- , --.

Signed and Sealed this
Nineteenth Day of February, 2019

Andrei Iancu
*Director of the United States Patent and Trademark Office*